US 9,657,604 B2

(12) United States Patent
Sjödin

(10) Patent No.: US 9,657,604 B2
(45) Date of Patent: May 23, 2017

(54) COGENERATION PLANT WITH A DIVISION MODULE RECIRCULATING WITH A FIRST COMBUSTION GAS FLOW AND SEPARATING CARBON DIOXIDE WITH A SECOND COMBUSTION GAS FLOW

(75) Inventor: Mats Sjödin, Finspong (SE)

(73) Assignee: SIEMENS AKTIENGESELLSCHAFT, München (DE)

( * ) Notice: Subject to any disclaimer, the term of this patent is extended or adjusted under 35 U.S.C. 154(b) by 1257 days.

(21) Appl. No.: 13/383,283

(22) PCT Filed: Jul. 13, 2010

(86) PCT No.: PCT/EP2010/060022
§ 371 (c)(1),
(2), (4) Date: Feb. 27, 2012

(87) PCT Pub. No.: WO2011/006882
PCT Pub. Date: Jan. 20, 2011

(65) Prior Publication Data
US 2012/0137698 A1    Jun. 7, 2012

(30) Foreign Application Priority Data

Jul. 13, 2009    (EP) .................................... 09009103

(51) Int. Cl.
*F02C 6/00*    (2006.01)
*F22B 1/18*    (2006.01)
(Continued)

(52) U.S. Cl.
CPC ............ *F01K 23/10* (2013.01); *F01K 17/025* (2013.01); *F02C 3/34* (2013.01); *F02C 6/18* (2013.01);
(Continued)

(58) Field of Classification Search
CPC .......... F01K 17/025; F01K 23/10; F02C 3/34; F02C 6/18; Y02E 20/16; F22B 1/1815; F28D 214/0003
(Continued)

(56) References Cited

U.S. PATENT DOCUMENTS 2,303,381 A  * 12/1942 New ................................ 60/774
3,422,800 A     1/1969 La Haye
(Continued)

FOREIGN PATENT DOCUMENTS

CN    101238341 A    8/2008
DE    10330859 A1    2/2004
(Continued)

*Primary Examiner* — Pascal M Bui Pho
*Assistant Examiner* — Eric Linderman

(57) ABSTRACT

A cogeneration plant is provided that includes a gas turbine, a heat recovery steam generator, a steam turbine and a cooler/condenser. A division module is provided at a division point, via which downstream the heat recovery steam generator the combustion gas is cooled and dehumidified in the cooler/condenser and then divided into a first combustion gas flow and a second combustion gas flow. A second condenser is provided for receiving the second combustion gas flow to separate contained carbon dioxide from contained water by condensation of the water. The cogeneration plant further includes a heater and a compressor for receiving the first combustion gas flow, which is heated, compressed and partly extracted to by-pass the combustor for cooling of the gas turbine before it enters the combustor and mix with the flow of oxygen and fuel to be burned in the gas turbine.

14 Claims, 1 Drawing Sheet

(51) Int. Cl.
*F28D 21/00* (2006.01)
*F01K 23/10* (2006.01)
F01K 17/02 (2006.01)
F02C 6/18 (2006.01)
F02C 3/34 (2006.01)

(52) U.S. Cl.
CPC ........ *F22B 1/1815* (2013.01); *F28D 21/0003* (2013.01); *Y02E 20/14* (2013.01); *Y02E 20/326* (2013.01); *Y02E 20/344* (2013.01)

(58) Field of Classification Search
USPC .......................................................... 165/9.3
See application file for complete search history.

(56) References Cited

U.S. PATENT DOCUMENTS

| | | | | |
|---|---|---|---|---|
| 3,992,891 | A * | 11/1976 | Pocrnja | 62/50.3 |
| 4,131,432 | A * | 12/1978 | Sato et al. | 422/177 |
| 4,622,275 | A * | 11/1986 | Noguchi | F01K 3/188 |
| | | | | 429/423 |
| 5,398,497 | A * | 3/1995 | Suppes | B01D 53/1481 |
| | | | | 60/39.511 |
| 5,572,861 | A | 11/1996 | Shao | 60/781 |
| 5,809,768 | A * | 9/1998 | Uematsu et al. | 60/39.465 |
| 6,202,442 | B1 | 3/2001 | Brugerolle | 62/649 |
| 6,266,953 | B1 * | 7/2001 | Ramstetter et al. | 60/783 |
| 6,655,150 | B1 * | 12/2003 | Åsen | B01D 53/1475 |
| | | | | 60/39.5 |
| 7,299,637 | B2 * | 11/2007 | Becker | F02C 3/34 |
| | | | | 60/39.182 |
| 8,813,471 | B2 * | 8/2014 | Gulen | F02C 6/18 |
| | | | | 60/39.182 |
| 9,391,254 | B2 * | 7/2016 | Lessard | H01L 35/30 |
| 2001/0049934 | A1 * | 12/2001 | Ranasinghe et al. | 60/39.182 |
| 2002/0023423 | A1 * | 2/2002 | Viteri et al. | 60/39.02 |
| 2002/0059792 | A1 * | 5/2002 | Oto et al. | 60/39.182 |
| 2004/0011057 | A1 * | 1/2004 | Huber | 60/781 |
| 2004/0068989 | A1 * | 4/2004 | Wantanabe | F02G 5/02 |
| | | | | 60/670 |
| 2004/0074238 | A1 * | 4/2004 | Wantanabe | F02C 6/18 |
| | | | | 60/784 |
| 2004/0244381 | A1 * | 12/2004 | Becker | 60/772 |
| 2005/0241311 | A1 * | 11/2005 | Pronske et al. | 60/645 |
| 2006/0207245 | A1 * | 9/2006 | Yamaguchi | F01N 5/02 |
| | | | | 60/320 |
| 2007/0251239 | A1 * | 11/2007 | Huber | 60/682 |
| 2008/0028765 | A1 * | 2/2008 | Bartlett | 60/780 |
| 2008/0104958 | A1 * | 5/2008 | Finkenrath et al. | 60/605.2 |
| 2008/0276605 | A1 * | 11/2008 | Miyagawa | F01N 5/02 |
| | | | | 60/320 |
| 2008/0309087 | A1 * | 12/2008 | Evulet et al. | 290/52 |
| 2009/0107141 | A1 * | 4/2009 | Chillar et al. | 60/605.2 |
| 2009/0173073 | A1 * | 7/2009 | Guidati | B01D 45/16 |
| | | | | 60/670 |
| 2009/0199566 | A1 * | 8/2009 | Lebas et al. | 60/772 |
| 2009/0205334 | A1 * | 8/2009 | Aljabari et al. | 60/605.2 |
| 2009/0320473 | A1 * | 12/2009 | Krieger | F01K 25/08 |
| | | | | 60/641.2 |
| 2010/0058764 | A1 * | 3/2010 | Conchieri | 60/739 |
| 2010/0095673 | A1 * | 4/2010 | Vigild et al. | 60/605.2 |
| 2010/0326084 | A1 * | 12/2010 | Anderson et al. | 60/775 |
| 2011/0120137 | A1 * | 5/2011 | Ennis | 60/780 |
| 2011/0173991 | A1 * | 7/2011 | Dean et al. | 60/801 |
| 2011/0252827 | A1 * | 10/2011 | Lockwood | B01D 53/002 |
| | | | | 62/602 |
| 2012/0096870 | A1 * | 4/2012 | Wichmann et al. | 60/801 |
| 2012/0180657 | A1 * | 7/2012 | Monereau | B01D 53/002 |
| | | | | 95/45 |
| 2012/0297821 | A1 * | 11/2012 | Baxter | B01D 53/343 |
| | | | | 62/617 |
| 2013/0031910 | A1 * | 2/2013 | Merchant et al. | 60/772 |
| 2013/0104563 | A1 * | 5/2013 | Oelfke et al. | 60/773 |
| 2014/0245768 | A1 * | 9/2014 | Rockenfeller | F25B 27/007 |
| | | | | 62/235.1 |

FOREIGN PATENT DOCUMENTS

| | | |
|---|---|---|
| EP | 1429000 A1 | 6/2004 |
| EP | 2383522 A1 * | 11/2011 |
| JP | 10-082306 | 3/1998 |
| JP | 11062619 A | 3/1999 |
| JP | 3073468 B2 | 8/2000 |
| WO | WO 0048709 A1 | 8/2000 |

* cited by examiner

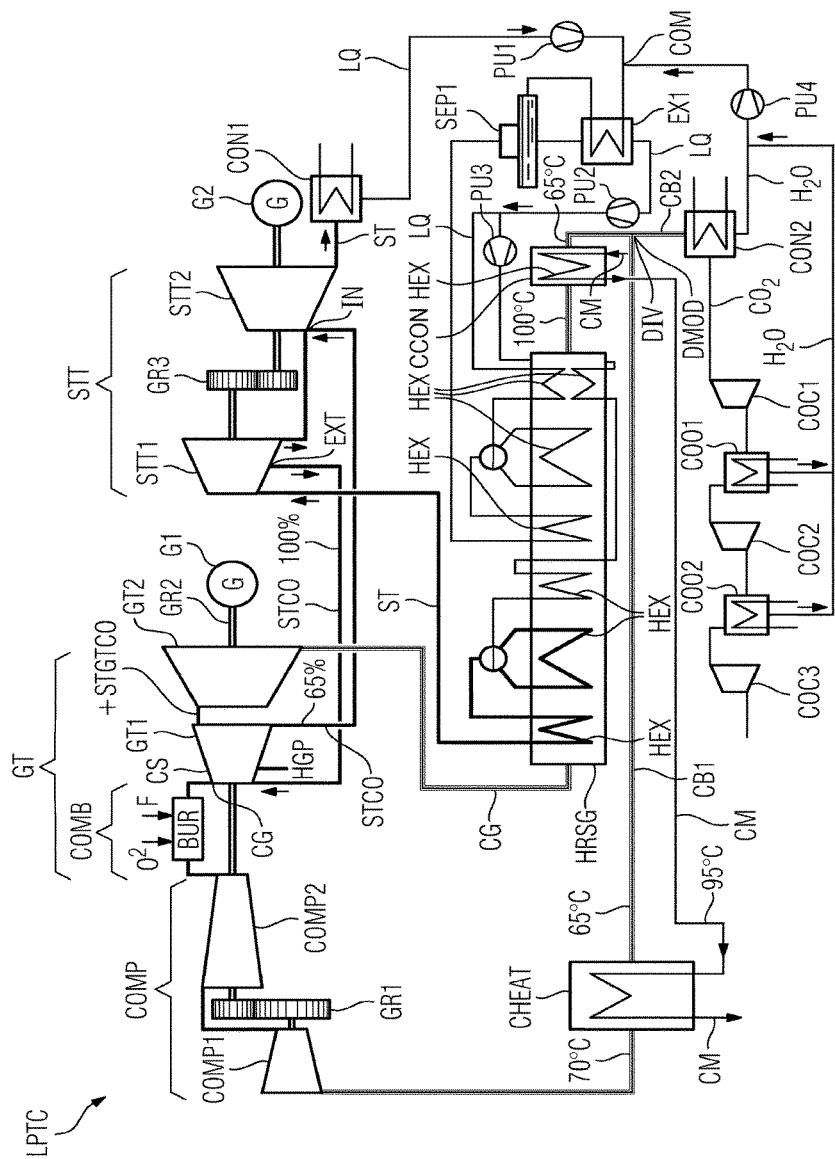

US 9,657,604 B2

COGENERATION PLANT WITH A DIVISION MODULE RECIRCULATING WITH A FIRST COMBUSTION GAS FLOW AND SEPARATING CARBON DIOXIDE WITH A SECOND COMBUSTION GAS FLOW

CROSS REFERENCE TO RELATED APPLICATIONS

This application is the US National Stage of International Application No. PCT/EP2010/060022, filed Jul. 13, 2010 and claims the benefit thereof. The International Application claims the benefits of European application No. 09009103.4 filed Jul. 13, 2009. All of the applications are incorporated by reference herein in their entirety.

FIELD OF INVENTION

The invention relates to a plant and a method of cogeneration, by burning a fuel in a gas turbine cycle for generation of a combustion gas utilized for heating water into steam in a steam cycle, wherein said gas turbine cycle includes
a gas turbine, to expand a combustion gas,
a combustor of said gas turbine, burning a mixture of fuel, oxygen and a recirculated first flow of combustion gas, generating combustion gas to be expanded,
a heat recovery steam generator, arranged downstream the gas turbine, receiving combustion gas to heat liquid water and steam, resulting in steam and/or superheated steam,
a division module at a division point, by means of which downstream said heat recovery steam generator said combustion gas is divided into said recirculated first combustion gas flow and a second combustion gas flow,
a compressor, receiving said first combustion gas flow, which is compressed to enter the combustor and mix with said flow of oxygen and fuel to be burned in said gas turbine, said steam cycle includes:
a steam turbine, by means of which said steam is expanded,
a first condenser, arranged downstream the steam turbine, by means of which expanded steam is at least partially condensed to liquid water,
a first pump, wherein said first pump delivers said liquid water with increased pressure to said heat recovery steam generator to be heated up by heat exchange with said combustion gas.

BACKGROUND OF INVENTION

Due to the increasing awareness to climate relevant emissions a lot of effort is undertaken to minimize the emission of carbon dioxide, which is thought to be one of the most relevant reasons for the increase of the world's temperature respectively the greenhouse effect. Latest developments led to cogeneration cycles having zero emission and a higher efficiency. Within this cycle fossil fuels are burned with pure oxygen, which enables the separation of the carbon dioxide, generated during the oxidation, in a cost effective way by condensation of the H2O-fraction of the combustion gas. The increased cycle efficiencies compensate at least partly the efforts for the supply of pure oxygen undertaken in an upstream air separation module. This cycle becomes a zero emission cycle if the separated carbon dioxide is stored at an adequate location.

Basically these cycles consist of a so called closed Brayton Cycle operated at a high temperature combined with a low temperature Rankine Cycle. Typically the Brayton Cycle consists of compressors, a combustion chamber and a high temperature gas turbine. Often a Rankine Cycle consists of a steam turbine, a condenser and a steam generator. The steam generator might be a heat recovery steam generator. The turbine can be a one casing turbine or a combination of high-, intermediate- or low-pressure turbines. Preferably the fuel is natural gas or other hydro-carbon based fuel gas together with a nearly stochiometric mass flow of oxygen, which is supplied to a combustion chamber respectively burner, preferably operated at a pressure of 20 bar-60 bar depending on the chosen design parameters for the Brayton cycle, mainly turbine inlet temperature, turbine cooling concept and low pressure compressor inlet temperature. The high temperature turbine is therefore operated at a temperature of up to 1600° C. and the turbine cooling system utilizes the working medium from the compressor which is mainly a mixture of carbon dioxide and water as coolant. The relatively cool working medium from the compressor is also utilized as cooling medium for the burners respectively the combustion chamber and all other parts which are exposed to the high temperature from the combustion. After expansion in the Brayton cycle gas turbine the hot exhaust gas is cooled in a downstream heat recovery steam generator vaporising water and superheating steam for a Rankine cycle high pressure steam turbine.

SUMMARY OF INVENTION

It is one object of the invention to increase the efficiency of the Brayton cycle and to avoid erosion in the compressor.

In accordance with the invention there is provided a cogeneration plant and method of the incipiently mentioned type in accordance with the independent claims. The respectively dependent claims refer to preferred embodiments of the invention.

Referring to the invention, the cooled exhaust gas exiting the heat recovery steam generator is entering a cooler/condenser-module operating with a cooling medium preferably separated from the Rankine cycle. This cooler/condenser could be connected to an external cooling source such as sea water, ambient air, ambient air via an intermediate water system or a district heating grid. The main purpose of this cooler/condenser-module is to reduce the water content in the combustion gas to reduce the compressor work in the compression of the re-circulated stream. After the cooler/condenser the dehydrated, combustion gas stream is divided into two part flows, of which a first stream is re-heated before it is compressed and fed into the combustion chamber respectively burner and the second stream is a bleed stream compensating for the part of the injected fuel and oxygen that has not been separated in the cooler/condenser. The first stream that is to be re-compressed in the main cycle is also passing a re-heat heat exchanger before it is entering the compressor. The main purpose with this re-heat is to reduce the relative humidity in the flue gas stream to avoid erosion of the first compressor stages by water droplets. Together the cooler/condenser and the re-heat could be designed to generate favourable cycle conditions for the Brayton cycle in order to optimize the cycle efficiency, plant net present value or be designed to fit a temperature in the high temperature part of the compressor that is favourable from a material point of view. The amount of reduction of the water content in the flue gas generated from the condensation in the cooler/condenser-module and the temperature of the working medium into the compressor generated by the heater, together with the chosen compressor pressure ratio, makes it possible to reduce the compressor work and to design the cycle for an optimum compressor outlet temperature either for maximum cycle efficiency or for maximum plant net present value. The possibility to design the system to generate a certain temperature of the working medium before the compressor can also be utilized to keep the medium temperature in the high temperature parts of the compressor below the design temperature for discs, vanes and blades i.e. design the cycle for maximum pressure ratio. The second working medium stream from the division point is a bleed stream, balancing the rest of the feed streams of fuel and oxygen that have not been separated in the cooler/condenser module, containing mainly steam and carbon dioxide, supplied to a second condenser, in which the de-humidification of the combustion gas stream is continued in a second stage where more water is separated from the combustion gas. The separated water of the second condensation is fed into a water clean-up system from where it could be regarded as a by-product. The condensed water from the cooler/condenser is also drained to the same water clean-up system. This cycle is powered by the heat recovery steam generator heated by the exhaust gas of the high temperature turbine (gas turbine cycle) on the primary side vaporizing and superheating the water respectively steam on the secondary side.

The terms gas turbine, steam turbine and compressor are used synonymously for one or more respective machines, which might be arranged in serial or parallel order and are used to expand or compress essentially one respective process fluid flow.

The method of cogeneration disclosed might be performed with a power generation cycle, hereinafter referred to as a low pressure twin cycle. The low pressure twin cycle is a re-circulated oxy fuel cycle with a heat recovery steam generator generating steam for a steam cycle. The oxy fuel cycle utilizes an oxy fuel turbine unit—which is basically a gas turbine designed to operate with oxy fuel—including a compressor, a combustor and a turbine unit. Preferably a $H_2O$—$CO_2$-mixture is generated in the combustor by close to stochiometric combustion of hydrocarbons in pure oxygen. This mixture is then expanded in a gas turbine before entering the heat recovery steam generator unit. Downstream the heat recovery steam generator exhaust said mixture is cooled and partly dehydrated in a cooler/condenser-module. Said cooler/condenser-module preferably uses cooling or district heating water as cooling media before the cooled gas is re-heated and recycled through the compressor. Preferably the compressor comprises several units, for example a low pressure and a high pressure unit.

After the compression said mixture enters the combustor, which comprises a mixing chamber and the combustor. The combustor can be provided with several swirlers and burners for a highly efficient and stable combustion. Downstream the heat recovery steam generator said combustion gas is cooled and the moisture content of said combustion gas is partially condensed and the liquid phase is separated from the combustion gas flow before the gas flow is divided into a first combustion gas flow and a second combustion gas flow. Said first combustion gas flow is submitted to the described re-heat heat exchanger to reduce the relative humidity in the flue gas stream to avoid erosion of the first compressor stages before it is entering the compressor, but also to make it possible to reduce the moisture content of the combustion gas in a larger extent without reducing the temperature of the combustion gas flow into the combustion. Said first combustion gas flow is then submitted to the described compression to enter downstream the combustor of the gas turbine. Said second combustion gas flow is further cooled down to condense more of the moisture content of the combustion gas flow to liquid water in order to separate the vaporised water from the carbon dioxide, which is afterwards compressed and extracted from the cycle preferably in order to store this compressed gas finally.

BRIEF DESCRIPTION OF THE DRAWINGS

The invention will now be described, purely by way of example, with reference to the attached drawings, of which:

FIG. 1 shows a schematic overview of a cycle according to the invention.

DETAILED DESCRIPTION OF INVENTION

FIG. 1 shows a low pressure twin cycle LPTC, which combines a gas turbine GT and a steam turbine STT in one thermodynamic cycle essentially by a heat recovery steam generator HRSG. The gas turbine GT comprises a combustor COMB, a first gas turbine GT1 and a second gas turbine GT2, wherein the first gas turbine GT1 drives a compressor unit COMP and the second gas turbine GT2 drives a first generator G1 by means of a second transmission gear GR2. The compressor unit COMP comprises a low pressure compressor COMP1 and a high pressure compressor COMP2, which are both coupled to each other by means of a transmission gear GR1. The transmission gear GR1 has a gear ratio smaller 1 to give the low pressure compressor COMP1 a lower speed.

The combustor COMB is supplied with oxygen O2 and fuel F, which is mixed to a close to stochiometric mixture in a not further shown mixing chamber and burned in a burner BUR of the combustor COMB and expanded downstream the combustor COMB into the first gas turbine GT1 and the second gas turbine GT2 as a combustion gas CG. The oxygen O2 and the fuel F is mixed upstream the burner of the combustor COMB with a first flow of combustion gas CG1, which was compressed by the compressor COMP upstream the combustor COMB.

Downstream the expansion in the gas turbine GT the combustion gas CG is submitted to the heat recovery steam generator HRSG to be cooled down by way of heating up liquid water LQ to steam ST in order to gain super-heated steam ST. The heat recovery steam generator HRSG comprises several heat exchangers HEX, which transfer energy from the combustion gas CG to the liquid water LQ respectively the steam ST.

Downstream the heat exchange in the heat recovery steam generator HRSG the combustion gas CG is entering a cooler/condenser-module CCON operating with a cooling medium CM separated from the Rankine cycle. This cooler/condenser could be connected to an external cooling source as sea water, ambient air via a water system or a district heating grid. In the cooler/condenser CCON the humid fraction of the combustion gas is partly condensed into liquid water, which is separated from the working medium of the cycle CG. The condensed water from the cooler/condenser is drained to a water clean-up system. The main reason for this condensation is to reduce the H2O fraction in the dehydrated combustion gas CGDH re-circulated to the compressors to reduce the amount of compression work in the cycle.

Downstream the heat exchange in the cooler/condenser module CCON the combustion gas CG is divided at a division point DIV into a first flow of combustion gas CB1 and a second flow of combustion gas CB2, wherein the first flow of combustion gas CB1 is re-heated in a heater CHEAT before it enters the compressor COMP.

The second flow of combustion gas CB2 is submitted to a second condenser CON2 in order to cool down this mixture of water and carbon dioxide. In the second condenser CON2 a part of the humid fraction of the combustion gas CB2 is condensed into water H2O, which is separated from the rest of the gas mixture. By means of a number of compressors COC1-COC3 and intercoolers C001-C003 the carbon dioxide CO2 is compressed, the moisture content reduced and the carbon dioxide is cooled to liquid phase for transport and storage. The drawing shows by way of example three compressors and intercooling while the number of stages can in practice vary to more or less stages.

The water H2O condensed and separated in a second condenser CON2 and in a number of intercoolers is united at a junction point COM and submitted to a fourth pump PU4 and delivered to a higher pressure level.

The superheated steam ST leaving the heat recovery steam generator HRSG enters downstream a high pressure steam turbine STT1 of the steam turbine STT to be expanded.

The high pressure steam turbine STT1 is coupled to the intermediate pressure steam turbine STT2 by means of a third gear GR3, which enables different speeds of the two steam turbines. A second generator G2 is coupled to the intermediate pressure steam turbine STT2 to generate electricity. Downstream the steam turbine STT the steam ST enters a first condenser CON1 to be condensed into liquid water LQ.

Downstream the pump PU1 the liquid water LQ exchanges heat energy in a first heat exchanger EX1 before entering a first separator SEP1, which degasifies the liquid water LQ. After entering the cold site of the first heat exchanger EX1 the degasified liquid water LQ is delivered by a second pump PU2 to a higher pressure level to enter the cold site of the heat recovery steam generator HRSG. The liquid water LQ is stepwise increased in temperature in the heat recovery steam generator HRSG passing through several heat exchangers HEX, vaporized and superheated by heat exchange with the combustion gas CG from the exhaust of the gas turbine GT.

The super heated steam ST is submitted downstream the heat recovery steam generator HRSG into the high pressure turbine STT1 of the steam turbine ST to be expanded.

Within this expansion process of the steam turbine ST a cooling steam STCO is extracted at an extraction point by means of an extraction module EXT from the high pressure steam turbine STT1 to cool parts of a hot gas path HGP of the first gas turbine GT1. While 35% of the cooling steam STCO is injected into the hot gas path HGP for the purpose of film cooling, 65% of the cooling steam STCO leaves the cooling system CS of the gas turbine GT with a higher temperature. The remaining 65% of the cooling steam STCO are reunited with the main flow of the steam ST by means of a feeding module IN at the entrance of the low pressure steam turbine STT2, which also receives the steam ST exiting the high pressure steam turbine STT1. A portion of the cooling steam STCO can be injected into the hot gas path HGP of the gas turbine GT. Preferably the portion STGTCO is at least partially used for film cooling of rotating parts of the gas turbine GT.

Another embodiment provides the cooling system CS as a closed system with regard to the hot gas path HGP of the gas turbine GT and the cooling steam STCO is reunited with the steam ST in full amount. Good results were achieved, when the portion STGTCO to be injected into the hot gas path HGP was between 20% to 40% of said cooling steam STCO flow. Such an embodiment can preferably implemented, when the cooling steam STCO is only used to cool stationary parts of the gas turbine GT. Another preferred embodiment provides cooling for the rotating parts wherein rotating parts are cooled with said compressed combustion gas CG which is bypassed over the combustor to be injected into the hot gas path HGP.

Good efficiency can be obtained, when the combustion gas CG leaving the cooler/condenser-module CCON has a temperature of 55° C.-75° C. preferably 65° C. The separate cooling medium CM of the cooler/condenser-module CCON can be heated up in the cooler/condenser-module CCON depending on the heat exchange up to approx. 95° C., which temperature level can then be used to heat the heat exchanger CHEAT to increase the first combustion gas flow CB1 in temperature from 65° C. up to 70° C. which leads to a lower relative humidity.

The invention claimed is:

1. A cogeneration plant for burning a fossil fuel with pure oxygen in a gas turbine cycle for generation of a combustion gas utilized for heating water into steam in a steam cycle, the cogeneration plant comprising:
   the gas turbine cycle, and
   the steam cycle,
   wherein the gas turbine cycle comprises:
      a gas turbine for expanding the combustion gas,
      a combustor of the gas turbine that burns a mixture of the fossil fuel with the pure oxygen, and a recirculated first combustion gas flow of the combustion gas, for generating the combustion gas to be expanded,
      a heat recovery steam generator arranged downstream the gas turbine that receives the combustion gas to heat liquid water and steam, resulting in steam and/or superheated steam,
      a division module at a division point, via which, downstream the heat recovery steam generator, the combustion gas is divided into the recirculated first combustion gas flow and a second combustion gas flow, and
      a compressor that receives the recirculated first combustion gas flow, which is compressed to enter the combustor and mix with a flow of the mixture of the fossil fuel with the pure oxygen to be burned in the gas turbine,
   wherein the steam cycle comprises:
      a steam turbine, via which the steam is expanded,
      a first condenser arranged downstream the steam turbine, via which the expanded steam is at least partially condensed to the liquid water,
      a first pump that delivers the liquid water with increased pressure to the heat recovery steam generator to be heated up by heat exchange with the combustion gas,
      a cooler/condenser that receives the combustion gas is provided downstream the heat recovery steam generator, wherein the cooler/condenser is configured to cool the combustion gas and cause a humid fraction of the combustion gas to be partly condensed into the liquid water and drained, wherein downstream a heat exchange in the cooler/condenser, the combustion gas is divided by the division module into the recirculated first combustion gas flow and second combustion gas flow,
      a heater that is configured to heat and de-liquefy the recirculated first combustion gas flow with a cooling medium from the cooler/condenser after being heated up via the heat exchange in the cooler/condenser, which the heater is provided downstream the division module and upstream the compressor for heating and de-liquefying the recirculated first combustion gas flow before supplying the recirculated first combustion gas flow to the compressor, and a second condenser to which the second combustion gas flow is submitted in order to cool down a mixture of water and carbon dioxide, wherein the second condenser is configured such that in the second condenser a part of the humid fraction of the second combustion gas flow is condensed into water, which is separated from the rest of the mixture of water and carbon dioxide.

2. The cogeneration plant according to claim 1, wherein the cooler/condenser-module cools the combustion gas down to a temperature of between 65° C.-75° C.

3. The cogeneration plant according to claim 1, wherein the cooler/condenser partly condensates a vapor fraction of the combustion gas into liquid phase.

4. The cogeneration plant according to claim 1, wherein the cooler/condenser is cooled by a cooling medium separated from the steam cycle.

5. The cogeneration plant according to claim 4, wherein the cooling medium is selected from a group consisting of: sea water, ambient air, ambient air via an intermediate water system, and water from a district heating grid.

6. The cogeneration plant according to claim 1, wherein a compressor and intercooler system is provided downstream of the second condenser receiving the second combustion gas flow to reduce the moisture content by separating water from the second combustion gas flow, wherein the remaining carbon dioxide is compressed and cooled to liquid phase.

7. The cogeneration plant according to claim 1, wherein the compressor of the gas turbine cycle compresses the recirculated first combustion gas flow up to a pressure in the combustor of between 25 bar-55 bar.

8. The cogeneration plant according to claim 1, wherein an extraction module is provided to extract a flow of cooling steam at an extraction point within an expansion process of the steam in the steam turbine to be supplied to a cooling system of the gas turbine as a cooling fluid and, which flow of the cooling steam is at least partially reunited with a main flow of the steam during or after the expansion process of the steam in the steam turbine downstream the extraction point via a feeding module.

9. The cogeneration plant according to claim 8, wherein a portion of the flow of cooling steam is partially injected into a hot gas path of the gas turbine for cooling purpose.

10. The cogeneration plant according to claim 1, wherein the cooler/condenser-module cools the combustion gas down to a temperature of between 55° C.-85° C.

11. A method of burning a fossil fuel with pure oxygen in a gas turbine cycle of a cogeneration plant for the generation of a combustion gas utilized for heating water into steam in a steam cycle, the method comprising:

in the gas turbine cycle:
generating the combustion gas by burning a mixture of the fossil fuel with the pure oxygen, and a re-circulated first combustion gas flow of the combustion gas in a combustor, expanding the combustion gas in a gas turbine,
heating water into steam in the steam cycle in a heat recovery steam generator utilizing the combustion gas as the heating medium,
compressing the recirculated first combustion gas flow re-circulated from the heat recovery steam generator,
supplying a major fraction of the recirculated first combustion gas flow to the combustor, in the steam cycle:
generating the steam in the heat recovery steam generator,
expanding the steam in a steam turbine,
condensing the steam after expansion into water with a first condenser,
re-circulating the water to the heat recovery steam generator, cooling and/or condensing the combustion gas downstream the heat recovery steam generator in a cooler/condenser, which causes a humid fraction of the combustion gas to be partly condensed into the liquid water and drained, wherein downstream a heat exchange in the cooler/condenser, the combustion gas is divided by a division module into the recirculated first combustion gas flow and second combustion gas flow, dividing with the division module at a division point downstream a heat exchange in the cooler/condenser, the combustion gas into the recirculated first combustion gas flow and a second combustion gas flow, supplying the recirculated first combustion gas flow to a heater, heating and de-liquefying with the heater the recirculated first combustion gas flow before the compression of the recirculated first combustion gas flow using a cooling medium from the cooler/condenser after being heated up via the heat exchange in the cooler/condenser, wherein the heater is provided downstream the division module and upstream the compressor, and submitting the second combustion gas flow of the combustion gas to a second condenser in order to cool down a mixture of water and carbon dioxide, wherein in the second condenser a part of the humid fraction of the second combustion gas flow is condensed into water, which is separated from the rest of the gas mixture of water and carbon dioxide.

12. The method according to claim 11, wherein the cooler/condenser-module cools the combustion gas down to a temperature of between 65° C.-75° C.

13. The method according to claim 11, further comprising the steps of:
condensing in the cooler/condenser, at least partly, the humid fraction of the combustion gas into liquid phase, and
separating the liquid phase from the combustion gas.

14. The method according to claim 11, wherein the cooler/condenser is designed to minimize the humid fraction of the combustion gas, and the heater is designed to increase the temperature of the recirculated first combustion gas flow, such that the maximum temperature after the compression of the recirculated first combustion gas flow is reached so that a predetermined maximum pressure is reached for maximum gas turbine cycle efficiency.

* * * * *